May 14, 1963  HANS-JOACHIM DAECHE  3,089,399
CAMERAS

Filed May 9, 1960  2 Sheets-Sheet 1

Inventor
HANS-JOACHIM DAECHE
By Irwin S. Thompson
Attorney

May 14, 1963   HANS-JOACHIM DAECHE   3,089,399
CAMERAS

Filed May 9, 1960   2 Sheets-Sheet 2

Inventor
HANS-JOACHIM DAECHE
By Irwin S. Thompson
Attorney

United States Patent Office 3,089,399
Patented May 14, 1963

3,089,399
CAMERAS
Hans-Joachim Daeche, Dresden, Germany, assignor to VEB Kamera- und Kinowerke Dresden, Dresden, Germany
Filed May 9, 1960, Ser. No. 27,846
4 Claims. (Cl. 95—42)

Several proposals have already become known according to which a diaphragm arrangement tensioned against spring action to full aperture springs into a preselected position after release of a locking arrangement which holds it in this position. The movement for the release of the locking arrangement is derived from the movement for the release of the shutter.

Another proposal uses a setting member both for the setting of the mirror into the observation position and also for the tensioning of the diaphragm mechanism of the objective lens to full aperture.

The first-mentioned group of known proposals has the disadvantage that for the tensioning of the diaphragm mechanism an additional manual operation is necessary. The last-mentioned proposal in fact removes this defect, but has the disadvantage that the mechanism for the tensioning of the diaphragm mechanism is unsuitable for the use of different spring diaphram objective lenses with different full apertures.

The invention removes the stated defects and achieves further advantages due to the fact that into the transmission mechanism for the opening of the diaphragm to its full aperture and for the tensioning of the spring diaphragm mechanism there is inserted a spring and in further development of the invention the movement for the opening of the diaphragm to its full aperture is derived from the movement of a covering flap, which when in the observation position serves in common with the mirror for the light-tight covering of the light-sensitive material.

A constructional form of the invention will now be explained in greater detail by way of example with reference to the accompanying diagrammatic drawings from which further features of the invention may be seen. Details which are not directly connected with the invention have been omitted.

Figure 1:
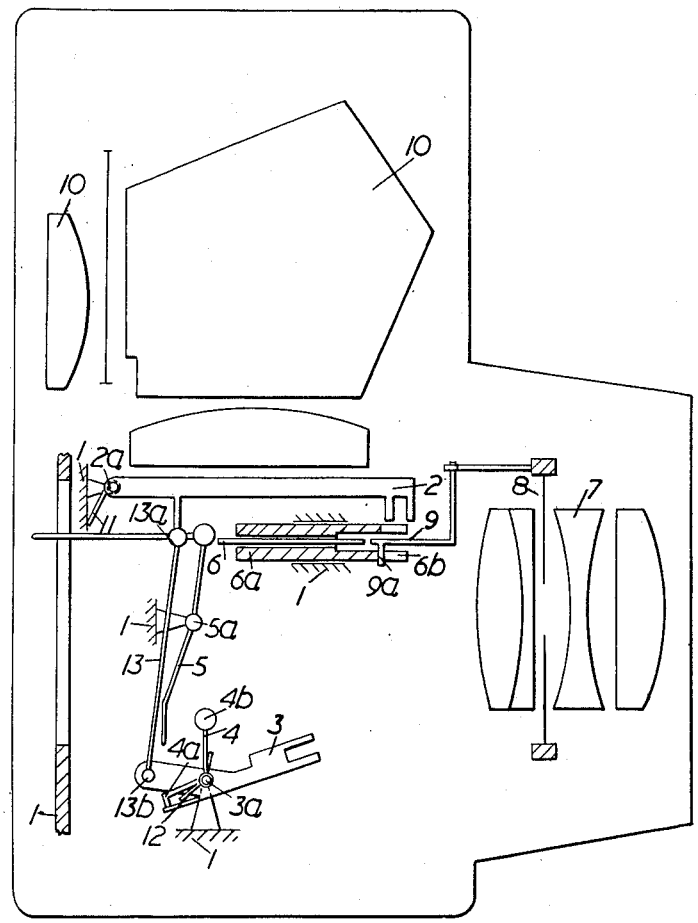
Figure 2:
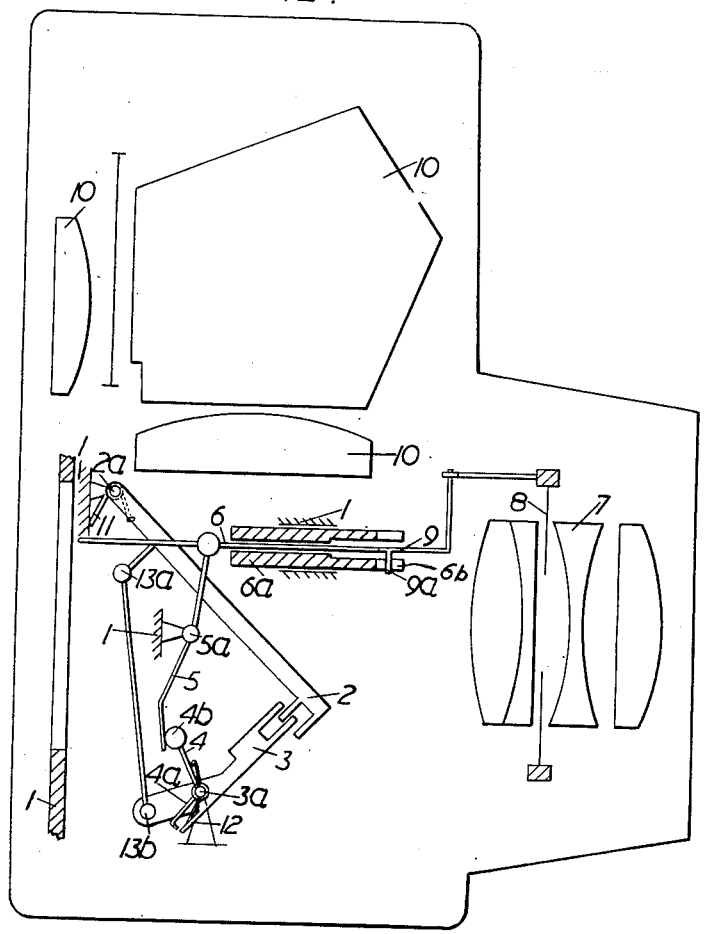

FIGURE 1 shows a section through a camera equipped in accordance with the invention, the diaphragm push rod being uninfluenced, FIGURE 2 shows a section similar to FIGURE 1, with the diaphragm open.

In a camera housing 1 there are mounted a hinged mirror 2 at 2a, a covering flap 3 at 3a, a lever 4 also at 3a, a double lever 5 at 5a, a push rod 6 in a sleeve 6a, an objective lens 7 with a diaphragm 8 and a diaphragm push rod 9 and a three-part prismatic viewfinder 10 (FIGURES 1 and 2).

A coupling element 13, articulated at the points 13a and 13b, connects the hinged mirror 2 with the covering flap 3. The two parts—hinged mirror 2 and covering flap 3—are therefore subject to the action of a spring 11 mounted coaxially with the hinged mirror 2. Coaxially with the covering flap 3 there are mounted the lever 4 and a torsion spring 12. The torsion spring 12 connects the covering flap 3 and the lever 4 elastically. With one end 4a, the lever 4 bears upon the covering flap 3 against the action of the torsion spring 12. The other end 4b of lever 4 rests when the hinged mirror 2 and the covering flap are in the observation position, upon an arm of the double lever 5, the other arm of which presses upon the push rod 6. The push rod 6 provides the connection of double lever 5 with the diaphragm push rod 9 and thus with the diaphragm in the objective lens 7. The sleeve 6a is movable in its axial direction with the aid of setting means (not shown) and securable. Furthermore it possesses a slot 6b, into which there extends a projection 9a of the diaphragm push rod 9 (FIGURE 2).

In FIGURE 1 the arrangement is shown in its rest position. The hinged mirror 2 is hinged upwards and clears the ray path from the objective lens 7 to the image aperture. The diaphragm 8 is closed to the pre-selected value, since the extension 9a of the diaphragm push rod 9 has pressed upon the bottom of the slot 6b. The push rod 6 is pushed back.

On winding of the film and cocking of the shutter a gearing, which engages on the coupling element 13, conducts the hinged mirror 2 and thus the covering flap 3 against the action of the spring 11 into the observation position (FIGURE 2). This movement of the covering flap 3 is transmitted by the torsion spring 12 to the lever 4, which transmits it through its end 4b to the double lever 5, which in turn shifts the push rod 6 towards the objective lens 7, presses upon the diaphragm push rod 9 and brings the diaphragm 8 to full aperture through a conventional coupling therebetween. The stroke which the lever 4 can transmit is so dimensioned that all possible diaphragm values from the minimum to the maximum diaphragm aperture are covered. In the case of an objective lens whose greatest aperture is below the maximum possible aperture, the remaining stroke of the covering flap 4 is taken up by the torsion spring 12. If the hinged mirror 2 is cleared by actuation of the housing release, it and the covering flap 3 spring back into their initial position under the action of the spring 11. The diaphragm push rod 9 jumps as far as the abutment given by the bottom of the slot 6b, and the pre-selected diaphragm aperture is set. A further advantage of the resilient arrangement resides in that it permits of setting the diaphragm 8 by means of a special handle element to the pre-selected value, for the purpose of consideration of the depth of focus, while the hinged mirror is situated in the observation position.

I claim:
1. In a monocular reflex camera having a housing, a prismatic viewfinder arranged therein, an objective lens and a shutter device, said shutter device having a shutter cocking member operatively connected thereto, an adjustable aperture diaphragm, aperture setting means, a mirror within said housing hingedly connected to the housing and movable between a first position in which the mirror is clear of the optical axis of said objective lens and a second position where light rays from said objective lens are reflected from said mirror into said prismatic viewfinder, a covering flap within the housing and pivotally connected to the housing, each of said mirror and covering flaps having a free end displaced from their connections to said housing which cooperate with each other to provide a light-sealed connection therebetween, a coupling member pivotally connected between said mirror and covering flap, said coupling member being operatively connected to said cocking member to simultaneously move said mirror and covering flap toward each other so that said free ends thereof engage each other to provide said light-sealed connection, a first lever pivotally carried by said housing and drivable by said covering flap, a second lever pivotally carried by the housing and drivable about its pivot by said first lever, a first push-rod slidably mounted in said housing and drivable by said second lever in an axial direction, a second push-rod engageable by said first push-rod, and means operatively connected to said aperture diaphragm to normally maintain same in a closed position for the purpose of taking a picture and to abut against said second push-rod so that when said second push-rod is moved by said levers and first push-rod, said means opens said aperture diaphragm to a fully open position for viewing purposes.

2. A monocular reflux camera according to claim 1, wherein said first lever and said covering flap are mounted on a common pivot, and a torsion spring is also carried on said pivot and has two arms, one arm engaging the first lever and the other arm engaging an extension provided on said covering flap, whereby drive from the covering flap to the first lever is effected through said torsion spring.

3. In a monocular reflex camera having a housing, a prismatic viewfinder arranged therein, an objective lens and a shutter device, said shutter device having a spring-driven shutter cocking member, an adjustable aperture diaphragm, aperture setting means, and means operatively connected to the aperture diaphragm for moving the latter between a first position where the diaphragm is fully open for viewing purposes and a second position where the diaphragm is at the predetermined aperture for the purpose of taking a picture, the provision of a mirror within the housing hingedly carried by the housing and movable between a first position in which the mirror is clear of the optical axis of the objective lens and a second position where light rays from the objective lens are reflected into the prismatic viewfinder, a covering flap within the housing and pivotally carrier by the housing and whose free end is co-operable with the free end of the mirror to provide a light sealed joint, a coupling member pivotally connected between the mirror and the covering flap so that the mirror and covering flap move simultaneously, said coupling member being operatively connected to said cocking member, a first lever pivotally carried by the housing and drivable by the covering flap, a second lever pivotally carried by the housing and drivable by said first lever, a first push-rod slidably mounted in the housing for movement axially, a second push-rod engageable by said first rod and operatively connected to said means connected to the aperture diaphragm, said first lever and said covering flap being mounted on a common pivot, and a torsion spring also carried on said pivot and has two arms, one arm engaging the first lever and the other arm engaging an extension provided on said covering flap, whereby drive from the covering flap to the first lever is effected through said torsion spring.

4. A monocular reflex camera according to claim 3, wherein each of said levers is pivoted at a position between its ends.

References Cited in the file of this patent

UNITED STATES PATENTS

| | | |
|---|---|---|
| 2,356,880 | Pignone | Aug. 29, 1944 |
| 2,504,011 | Dunlap | Apr. 11, 1950 |
| 2,665,620 | King | Jan. 12, 1954 |
| 2,730,025 | Faulhaber | Jan. 10, 1956 |

FOREIGN PATENTS

| | | |
|---|---|---|
| 1,003,952 | France | Nov. 21, 1951 |